United States Patent [19]

Postupack

[11] 4,244,997
[45] * Jan. 13, 1981

[54] METHOD OF TREATING INTERLAYER MATERIAL AND LAMINATED WINDOWS COMPRISING INTERLAYER MATERIAL SO TREATED

[75] Inventor: Dennis S. Postupack, Natrona Heights, Pa.

[73] Assignee: PPG Industries, Inc., Pittsburgh, Pa.

[ * ] Notice: The portion of the term of this patent subsequent to Feb. 6, 1995, has been disclaimed.

[21] Appl. No.: 887,563

[22] Filed: Mar. 16, 1978

[51] Int. Cl.² .................................................. B32B 3/00
[52] U.S. Cl. .................................. 428/174; 428/194; 428/203; 428/210; 428/220; 428/425.5; 428/429; 428/424.2; 428/441; 428/448; 428/451; 428/483; 428/515; 428/423.3
[58] Field of Search ............... 428/194, 203, 207, 204, 428/220, 437, 174, 210, 423, 424, 441, 448, 451, 483, 515; 156/99, 100, 102, 106, 240, 230, 103, 277, 312, 309, 242, 306; 239/3, 15; 427/32, 33, 269, 256, 287, 163, 280, 165, 168, 14, 282, 27, 29, 30, 31

[56] References Cited

U.S. PATENT DOCUMENTS

| | | | |
|---|---|---|---|
| 2,593,405 | 4/1952 | Beckham | 156/100 |
| 2,933,759 | 4/1960 | Startzell | 156/100 |
| 3,113,034 | 12/1963 | Fix | 156/100 |
| 3,455,197 | 7/1969 | Richardon | 83/467 |
| 3,467,332 | 9/1969 | Bachman | 83/614 |
| 3,696,186 | 10/1972 | Stark et al. | 264/292 |
| 3,922,456 | 11/1975 | Baldoidy | 428/437 |
| 4,138,284 | 2/1979 | Postupack | 156/100 |

*Primary Examiner*—Stanley S. Silverman
*Attorney, Agent, or Firm*—Edward I. Mates

[57] ABSTRACT

This invention relates to making continuous ribbons of clear, flexible interlayer material into a maximum number of interlayers having a coating of graded intensity along a longitudinal edge portion thereof for use in curved laminated safety glass windshields. The method avoids rubbing or differentially stretching the flexible interlayer material during processing, which includes cutting a continuous ribbon of clear, flexible interlayer material into successive interfitting flexible sheets of trapezoidal shape, applying a shade band, preferably by electrostatic spraying, to a predetermined portion of each sheet and laminating the sheet so treated to one or more rigid transparent sheets of glass or a recognized plastic substitute for glass.

When the flexible sheets so treated are laminated to one or more relatively rigid transparent bent sheets of glass or rigid transparent plastic, the resulting laminates are safer than those produced by the prior art method that requires differentially stretching the partially shaded interlayer and have better optical properties than prior art shaded laminates comprising interlayers produced by pervious prior art techniques that incorporated rubbing the sheet while applying a coating.

11 Claims, 5 Drawing Figures

METHOD OF TREATING INTERLAYER MATERIAL AND LAMINATED WINDOWS COMPRISING INTERLAYER MATERIAL SO TREATED

BACKGROUND OF THE INVENTION

1. Field of the Invention

This invention relates to curved laminated transparencies comprising a flexible interlayer having a shade band of uniform tone but a pattern of graded intensity laminated to one or more rigid, transparent sheets of glass or rigid transparent plastic, and to preparing a thermoplastic interlayer for a curved laminated glass assembly having a colored, light-absorbing band in a marginal area of its thermoplastic interlayer. The present invention more especially relates to a method for the preparation of individual interlayers from a continuous ribbon of clear flexible interlayer material and to the use of such interlayers in laminated windshields having more acceptable optical properties and/or improved resistance to impact than those containing interlayers produced by other methods developed in the prior art.

Windshields of automobiles utilize laminated glass assemblies comprising two sheets of glass and a thermoplastic interlayer such as a sheet of plasticized polyvinyl butyral resin or polyurethane. In the current models of automobiles these glass assemblies are bent along the longitudinal axis. In the manufacture of these curved laminated glass assemblies, a thermoplastic interlayer is placed between two matched curved glass sheets and the resulting sandwich is subjected to a laminating process to form a transparent laminated glass assembly. The thermoplastic interlayer is provided with a marginal rectilinear or straight band of a light-absorbing material in order to reduce glare from the sun when the laminated glass assembly is mounted as a windshield in an automobile. The marginal band is preferably graduated in concentration of light-absorbing material with the greatest concentration of light-absorbing dye being present nearest the upper peripheral portion of the thermoplastic interlayer and the dye concentration in the band diminishes gradually toward the lower edge of the band until the amount at the lower edge is almost imperceptible. When such a graduated dyed band in the plastic interlayer is laminated between a pair of curved glass sheets and the resulting laminated windshield is mounted in a tilting or non-vertical fashion, the cut-off point between the dyed band and the undyed portion appears to be curved to a person inside the car. In order to provide an apparent horizontal cut-off line between the dyed band and the non-dyed portion, it is necessary to distort the flat thermoplastic interlayer sheet to curve the boundary between the dyed and the undyed portion in such a manner as to compensate for the curvature that results from differential distortion of the interlayer sheet.

Flat thermoplastic interlayer sheets having a curved colored band suitable for use as interlayers in curved laminated glass assemblies have been prepared from a continuous thermoplastic sheet having a straight colored band by differential stretching of the sheet until the colored band is curved and then heating the sheet while in the stretched condition in order to relieve stresses. The sheets are then cooled to room temperature while still in a stretched condition. Such a method is limited with respect to the amount of stretch that can be used as well as with respect to the degree and type of curvature obtainable.

Thermoplastic sheets stretched differentially by the method described have a non-uniform thickness even when cut from a continuous ribbon of interlayer material of uniform thickness. Furthermore, the heating of the differentially stretched sheet does not eliminate the stresses entirely.

The combination of the residual differential stresses and the difference in thickness resulting from the differential stretching of the thermoplastic sheets (which usually vary about 5 mils (0.13 mm) in interlayer sheets of 30 mils (0.762 mm) nominal thickness) makes it difficult to obtain a uniform bonding between the thermoplastic interlayer sheets and a glass sheet or a pair of glass sheets to produce a laminated safety glass windshield. Laminating assemblies having interlayers of non-uniform thickness in an oil autoclave may result in some oil penetration at the interface between the thinner portion of the interlayer and the glass or other rigid transparent sheet. Furthermore, differential stretching causes certain unevenness in the gradation or texture of the band of shading that is applied to the interlayer material. The art of shaded laminated automobile windshields required some improvement to provide tinted windshields that were not susceptible to delamination and had better optical properties than those available from the prior art.

2. Description of the Prior Art

U.S. Pat. No. 3,455,197 to Richardson and U.S. Pat. No. 3,467,332 to Bachman disclose different types of apparatus for cutting a continuous sheet or ribbon of clear plastic interlayer material into interfitting trapezoidal shapes. Such apparatus are designed for ultimate use of the clear plastic in windshields that do not have dyed portions.

U.S. Pat. No. 3,113,034 to Fix discloses an axially displaceable printing roller whose axial reciprocating movement is correlated with the movement of a continuous ribbon of plastic interlayer material to provide a graded pattern of dye that is repeated along the length of the continuous ribbon. Such ribbon must necessarily be cut with triangular end portions that do not interfit. Furthermore, the axial reciprocation of the printing roller forms rub marks that impair the optical properties of the printed portion of the interlayer.

U.S. Pat. No. 3,593,405 to Beckham discloses a typical prior art technique involving the application of a shade band of graded intensity onto a rectangular sheet of plastic interlayer material. The interlayer material containing the shaded portion of graded intensity is differentially stretched to provide a curved cut-off line so as to appear substantially horizontal when laminated between curved glass sheets and installed in a tilted position in a frame of an automobile.

U.S. Pat. No. 2,933,759 to Startzell discloses an umbrella-type apparatus for simultaneously differentially stretching the opposite side edges of a plurality of layers of a continuous ribbon of plastic interlayer material so that the plurality of layers may be simultaneously differentially stretched when the umbrella-type of plastic stretching apparatus is opened. Stretch marks usually remain in the interlayer sheeting. When the shape requires severe differential distortion, these can extend into the shaded region.

U.S. Pat. No. 3,696,186 to Stark et al discloses apparatus for differentially stretching a continuous ribbon of dyed interlayer material by passing the latter while heated to deformation temperature over a portion of a conical roll and then rapidly chilling the differentially stretched plastic interlayer material. Non-uniform stretching results in non-uniform thickness.

The teachings in the patents enumerated and described previously fail to provide a method of treating clear interlayer material so that a maximum number of interfitting trapezoidal shapes can be provided with a graded shade band along a specific longitudinal edge portion thereof for lamination with curved glass to result in a laminated glass-plastic windshield having a plastic layer of substantially uniform thickness, of substantially uniform tension of a low magnitude merely sufficient to avoid wrinkling and of substantial uniformity of adhesion to the glass throughout the entire extent of the laminated windshield.

SUMMARY OF THE INVENTION

According to the present invention, a continuous ribbon of plastic interlayer material of substantially uniform overall thickness is cut into successive lengths of interfitting trapezoidal shapes. The ribbon is preferably embossed to avoid entrapping air in the resulting laminate. The individual sheets so formed are oriented into a predetermined orientation. This may be accomplished after stacking alternate trapezoidal sheets in separate layers and orienting each stack to facilitate removing each sheet from its associated stack in its desired predetermined orientation.

Each sheet has a graded coating applied to a portion thereof while so oriented. The sheet is supported in unwrinkled condition with a minimum of stress applied thereto during the application of the coating. Each sheet of trapezoidal shape of said plastic interlayer material is supported in such a manner as to avoid wrinkling and differential stretching during the step of applying the coating. A coating of graded intensity is applied to a preselected longitudinal portion only of each trapezoidal sheet so that the resulting coated interlayer sheet has a substantially uniform thickness (except for an embossment pattern) and has a substantially uniform stress of small magnitude sufficient to avoid wrinkling throughout its entire extent. The non-uniform application of the graded coating does not appreciably affect the uniform thickness and substantially uniform stress of the trapezoidal sheets. The uniform thickness improves the ability of the interlayer to be adhered or bonded uniformly to a curved glass sheet with which it forms a laminated safety glass windshield with minimum chance for oil penetration at the portion of the interface between a thinner portion of a differentially stretched interlayer and the adjacent glass sheet during fabrication of the laminated windshield and minimizes the chance for delamination due to local points of high stress which serve as origins of delamination in the laminated windshield. These points of high stress may be the result of differential stretching during the distortion of the plastic interlayer in order to convert a straight line cut-off between the shaded and clear portions of plastic or may be due to the inability of the glass to laminate successfully against the thinner portions of the plastic that result from the differential stretching of the plastic.

The present invention will be better understood in the light of a description of a specific embodiment thereof that follows.

BRIEF DESCRIPTION OF THE DRAWINGS

In the drawings which form part of a description of an illustrative embodiment of the present invention and wherein like reference numbers refer to like structural elements.

DESCRIPTION OF THE PREFERRED EMBODIMENT

According to the present invention, a continuous roll of flexible plastic interlayer material, such as polyurethane or plasticized polyvinyl butyral, is unrolled from a roll 10 to form a continuous ribbon 12. The ribbon 12 is cut into interfitting alternate sheets of trapezoidal shape 14 and 16 while the ribbon 12 is smoothly supported in an unwrinkled condition. A typical apparatus for treating a continuous ribbon of clear plastic is disclosed in U.S. Pat. No. 3,455,197 to Richardson. It is also feasible to wind the continuous ribbon about a special mandrel such as disclosed in U.S. Pat. No. 3,467,322 to Bachman. In the latter apparatus, a plurality of layers are wound in unwrinkled condition around the periphery of the mandrel and each circumference of the ribbon is cut at approximately two diamatrically opposite locations to form a pair of interfitting trapezoidal sheets from each layer.

Figure 1:
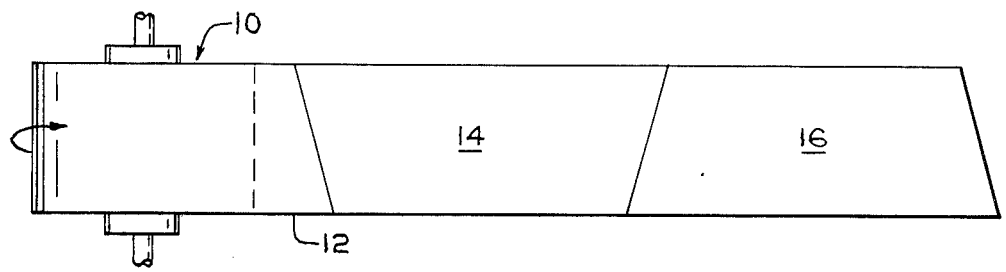
FIG. 1 is a schematic plan view of a roll of continuous plastic ribbon of interlayer material showing how the clear plastic ribbon is cut into interfitting lengths or sheets of interfitting trapezoidal shapes.
Figure 2:
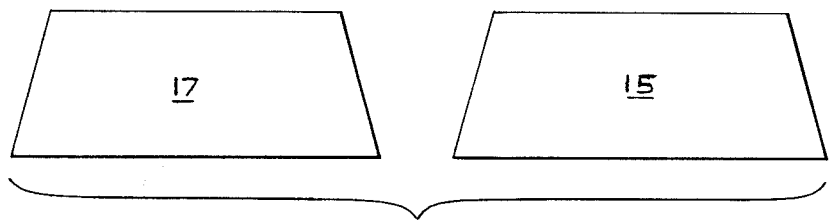
FIG. 2 is a plan view of a pair of sheets of trapezoidal shape showing how all the sheets of a stack are oriented perparatory to having a coating of graded intensity applied along a longitudinal area thereof.
Figure 3:
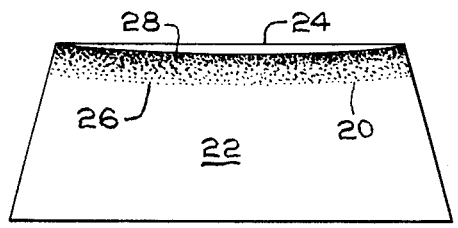
FIG. 3 shows a sheet of flexible interlayer material with the coating of graded intensity applied along a longitudinal extending portion thereof.
Figure 4:
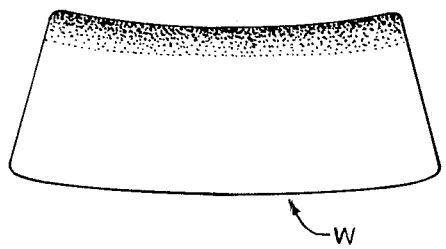
FIG. 4 is a frontal view of a laminated glass windshield with the interlayer bonded thereto.

After the sheets 14 and 16 of trapezoidal shape are cut and separated from the continuous ribbon 12, the alternate sheets 14 are stacked in one stack 15 in one common orientation and the alternate sheets 16 are stacked in another stack 17 oriented in another common orientation. Then each sheet 16 in turn is removed from stack 17 and applied in a desired orientation while at a uniformly but lightly stressed condition merely sufficient to avoid wrinkling on a supporting table, which may be a vacuum supporting table (not shown). Each sheet 14 in the stack 15 is oriented to the same orientation as stack 17 before each sheet 14 is treated similarly after the sheets 16 are depleted from stack 17. FIG. 2 shows how both stacks are oriented for sheet removal.

Each plastic sheet 14 or 16 of trapezoidal shape is brought to a dye applying station where a band of dye is applied to an area 20 that is exposed to a spray composition while the remaining areas 22 and 24 of the trapezoidally shaped sheets are shielded from contact with the spray composition.

The dyed area 20 of the substrate has a convexly curved bottom margin 26 of low intensity and an upper concavely curved margin of high intensity. The upper concavely shaped high intensity dyed boundary 28 conforms to the shape of the upper edge of one or more glass sheets to be laminated to the dyed interlayer material to form a bent laminated windshield having a graduated shade band that is graduated in intensity transverse to the longitudinal dimension of the windshield. The convexly shaped lower border 26 of the shade band area 20 is barely noticeable as the intensity of the dye applied decreases in a direction transvese to the longitudinal dimension of each sheet with a maximum intensity at its concave upper border and a minimum intensity along its convex lower border.

Figure 5:
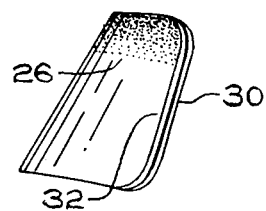
FIG. 5 is a cross-sectional view taken through a laminated window of FIG. 4 showing how the shade band of graded intensity appears to have a horizontal cut-off line when installed in a vehicle between a pair of bent glass sheets of matching curvature.

The curvature of the lower border 26 is so chosen that when the windshield comprising inner and outer glass sheets 30 and 32, respectively, is mounted in tilted relation in a windshield frame, as shown in FIG. 5, the convexly curved lower border 26 between the shaded area and the unshaded area 22 that is curved from the application of the dye appears as a horizontal line.

One of the important features of this invention is that during the handling of the plastic continuous ribbon or the individual sheets of trapezoidal shape that are cut from the plastic that it is held in smooth, slightly stretched relationship where the stretching is uniform throughout the entire extent of each plastic sheet that is cut from the continuous ribbon. It is also essential that the ribbon itself be maintained in a smooth, unwrinkled, slightly but uniformly stretched condition during the cutting operation. In this manner, the uniformity of thickness of the ribbon as received from the manufacturer of the ribbon (which approximates 30 mils (0.76 mm)±5 mils (0.13 mm) with embossments approximately 1 mil (0.025 mm) thick) is not distorted. The adhesion throughout the entire extent of the trapezoidal sheets of interlayer material to the glass is substantially uniform throughout the entire extent by virtue of the relative uniformity of thickness of the interlayer material of the laminated assembly.

During coating, the properly oriented sheet of flexible interlayer material, such as polyurethane of plasticized polyvinyl butyral, is supported directly on an apertured vacuum platen having a flat upper surface and vacuum is applied to hold the flexible sheet in a fixed position in an unwrinkled condition on the platen. The dye is applied obliquely and the nozzle of the spray gun may have its orifice modified to ensure a desired pattern of non-uniform intensity transverse to the longitudinal dimension of the substrate. Preferably, an electrostatic spray gun is used to provide finely divided particles of dye composition.

The coating station is usually enclosed and provided with a conventional exhaust hood (not shown) to remove any portion of the spray that does not adhere to the substrate. If desired, heat lamps may be provided to irradiate the coated portion of the substrate to help volatilize the volatile component of the dye composition applied.

It is noted that the boundary between the coated portion and the remainder of the flexible plastic sheet that is uncoated is curved. This curvature may be obtained by curving the edge of the masking means that is interposed between the spray gun and the portion of the substrate desired to be free of coating. If desired, a curved cam may be used to guide the reciprocating movement of one or more spray guns to provide the curved cut-off line between the coated and uncoated portions of the flexible interlayer sheet.

Suitable dye solutions comprise a mixture of organic dye components blended to yield a desirable color. A preferred dye mixture is a blend of blue, yellow and red-violet dye components. A preferred blue dye component comprises an anthraquinone derivative, such as 1,4-diethylamino-anthraquinone. A preferred yellow dye component is a monoazo compound with a molecular formula of $C_{17}H_{16}O_2N_4$. A preferred red-violet dye component appears by infrared analysis to be an anthraquinone derivative comprising an amine functionality. However, positive identification of the latter component is not obtainable. A preferred blend of the preferred dye component, 37 parts by weight of Solvaperm Red-Violet R, available from American Hoescht Corporation, 37 parts by weight of Calco Oil Blue N and 26 parts by weight of Calco Yellow G Concentrate available from American Cyanamid Corporation, yields a relatively colorfast blue-green shade band. This dye mixture or blend of dye components is dissolved in a concentration preferably about 1 to 2% by weight of dye components in a solvent system, which is preferably a combination of tetrahydrofuran and N-lower alkyl-pyrrolidone, preferably containing about 75 to 85% by volume of tetrahydrofuran and about 25 to 15% by volume of N-methyl-pyrrolidone. This solvent system satisfies the requirement of high dye solubility, preferably greater than 2%, and proper volatility to assure optical uniformity in the shade band. Non-uniformity in the shade band is caused by both too little volatility, which results in a mottled texture, and too high volatility, which results in undissolved dye particles being physically bonded to the surface of the substrate. The solvent system suggested is also an acceptable solvent for antioxidants and ultraviolet stabilizers which are preferably added to the dye component.

A typical dye composition comprising 38.5% by weight Solvaperm Red-Violet R, 38.5% Calco Oil Blue N and 23.0% Calco Oil Yellow G Concentrate (both Calco dyes available from American Cyanamid) is dissolved in a hundred milliliters of solvent for each 1.5 grams of the above dye composition. The solvent consists of 85% by volume of tetrahydrofuran and 15% of N-methyl-pyrrolidone. The solution thus formed is electrostatically sprayed on an unmasked portion of a sheet of polyurethane or plasticized polyvinyl butyral at an oblique angle to yield an optically uniform blue-green shade band in the lengthwise direction of the shade band and a graded intensity of shade band from a maximum intensity at one edge of the shade band to a relatively low intensity adjacent a convexly curved cut-off line with an uncoated portion beneath a mask during the coating.

Another suitable dye composition comprises 1.2 grams of the previous dye composition in 100 milliliters of a solvent system consisting of 80% by volume of tetrahydrofuran and 20% by volume of N-methyl-pyrrolidone and further comprising in addition to the solvent, 0.12 grams of an antioxidant, Irganox 1035 and 2.4 grams to an ultraviolet light stabilizer, Tinuvin 770, both available from Ciba-Geigy Corporation. The latter solution is also electrostatically sprayed to yield a relatively colorfast shade band having the desired gradation in one direction and uniform intensity in the other direction.

After the sheet of interlayer material is provided with the elongated shade band area, it is removed from the coating area while avoiding wrinkling and differentially stretching said interlayer material during its handling, maintained in a room of controlled temperature and humidity, preferably about 68° F. (20° C.) and 20% relative humidity and assembled as an interlayer between a pair of glass sheets of matching curvature with the boundary of the shaded area having relatively high intensity aligned with an edge of the curved glass sheet and the cut-off line of relatively less intensity aligned with marks previously made in the bent glass sheet. Excess plastic is trimmed and cut away from the margin of the assembly. The assembly of dyed interlayer material and two glass sheets is then prepressed by passing the assembly between a pair of prepressing rolls of the type depicted in U.S. Pat. No. 3,351,001 to Achkio, while at a temperature of 150° F.–225° F. (65° C.–107° C.) to remove air from between the interfaces of the assembly and to smooth the embossed pattern and to seal at least the peripheral edge portion of the interfaces between the components of the assembly. The rolled, prepressed assembly is then laminated in an oil autoclave under standard conditions, which involve temperatures of 225° F. to 300° F. (107° C. to 149° C.) and a simultaneous pressure of 175 psi to 225 psi (12.3 to 15.8 $Kg/cm^2$) for 15 to 60 minutes depending on the other parameters and the severity of shape of the assembly.

The tinted laminated windshields that result from the aforesaid operation have superior optical properties and superior resistance to oil penetration during fabrication and to delamination during subsequent use than windshields containing partially dyed interlayers that are differentially stretched prior to their assembly. The assembly produced according to this invention need not be edge rolled according to the method taught in U.S. Pat. No. 2,999,779 to Morris, which thickens the margin of the interlayer to improve the resistance to oil penetration at the interfaces during exposure to a pressurized oil autoclave. When the glass-plastic assembly containing an unwrinkled interlayer prepared according to the present invention is edge rolled, the marginal portion of the interlayer so treated develops a frame of different color intensity than the remainder of the shade band. The uniformity of thickness of the interlayer sprayed with a dye composition along an edge portion while in an unwrinkled condition avoids the need to thicken the peripheral portion preferentially.

If desired, the partially dyed sheet of flexible interlayer material may be laminated to a single glass sheet utilizing a parting material and a second glass sheet which is separated from the interlayer after lamination according to the technique disclosed in U.S. Pat. No. 3,808,077 to Rieser and Chabal. The description of the method of forming a bilayer windshield disclosed in this latter patent is incorporated herein by reference for the details of such an operation. Fabricating a bent bilayer windshield having an outer glass sheet with an exposed convex major surface is similar to fabricating a bent trilayer windshield with two outer bent glass plies except for interposing a layer of parting material between the interlayer sheet and the inner convex major surface of the inner glass sheet having an exposed concave major surface. The parting material facilitates removal of the inner glass sheet after lamination.

The resulting laminated windshields produced according to the present invention are characterized by better adhesion between the shaded plastic and the glass. It is believed that this is the result of the more uniform tensioning of the interlayer material with a small tension sufficient only to prevent wrinkling and of substantially uniform stress throughout the entire interlayer. The interlayer sheets, which have a substantially uniform thickness in the roll from which they are cut, are not distorted so that different portions thereof have different thicknesses, which makes the problem of adhering to the other elements of the laminated windshield exceedingly difficult. In other words, having a plastic interlayer of more nearly uniform thickness throughout provides an improved adhesion throughout the entire extent of the laminated windshield that results.

While the present invention is not so limited, typical thicknesses for the outer glass sheet of a bilayer windshield and for the inner and outer glass sheets of a trilayer windshield range between 0.040 inch (1 mm) and 0.250 inch (6 mm) and said layer of flexible plastic interlayer material is of substantially uniform thickness between 0.015 inch (0.4 mm) and 0.060 inch (1.5 mm).

The following test was performed to evaluate the relative impact resistance of laminates containing undistorted polyvinyl butyral interlayers between two glass sheets such as result from the present invention compared with that of similar laminates containing differentially stressed polyvinyl butyral interlayers. A first set of control laminates 12 inches (30 cm) square containing 2 sheets of float glass and a layer of plasticized polyvinyl butyral taken from a continuous roll having a nominal thickness of 30 mils (0.76 mm) and differentially stretched in the manner of stretching a continuous roll of dyed polyvinyl butyral required to develop a curved cut-off line between dyed and undyed portions of a shaded windshield interlayer were fabricated. The fabrication included standard laminating technique for sample fabrication involving prepressing followed by a final lamination in an oil autoclave at 200 psi and 275° F. for 45 minutes to produce 25 control specimens simulating specimens cut from the bottom portion of a standard production shaded windshield.

A set of 17 test specimens 12 inches (30 cm) square were also produced using 2 plies of float glass and 30 mils (0.76 mm) nominal thickness polyvinyl butyral to simulate the clear portion of a shaded windshield incorporating unstretched polyvinyl butyral interlayers using the same laminating procedure as for the control specimens. All the glass sheets in the specimens had the same nominal thickness.

The control specimens and the test specimens were subjected to impact tests to determine the mean break height from which a steel ball of 5 pounds (2.27 kg.) mass would penetrate a specimen. The ANSI Code Z 26.1, 1977, American National Standard Safety Code for Safety Glazing Materials for Glazing Motor Vehicles Operating on Land Highways, requires that 10 out of 12 specimens hold a 5 pound steel ball from a drop height of 12 feet. From the results obtained in these tests, the 42 specimens tested would be expected to pass the ANSI Code requirement. The results of the impact tests are as follows.

| MEAN HEIGHT PENETRATION TEST RESULTS | | | |
| --- | --- | --- | --- |
| Types of Specimen | Number of Specimens | Mean Penetration Height | Sigma |
| Control | 25 | 18.18 feet | 1.74 |
| Test | 17 | 16.66 feet | 1.22 |

The results of the penetration test conclusively proves the superiority of test specimens comprising unstretched interlayers to penetration compared to control specimens comprising differentially stretched interlayers. For laminated windshields having shade bands, the clear area of the prior art windshields that require differential stretching is less resistant to penetration on impact than the equivalent area of shaded laminated windshields produced with interlayers processed according to the present invention.

The form of the invention shown and described in this disclosure represents an illustrative preferred embodiment thereof. It is understood that various changes may be made without departing from the gist of the invention as defined in the claimed subject matter which follows.

We claim:

1. A laminated window comprising an outer curved sheet of relatively rigid, transparent glazing material selected from the group consisting of glass, polycarbonates, acrylic resins, hard polyurethanes and polyesters and a substantially uniformly stressed, smooth layer of substantially uniform thickness of a relatively flexible plastic material suitable for use as an interlayer for laminated windows selected from the group consisting of plasticized polyvinyl butyral, polyurethanes, ionomers and silicones laminated to said outer sheet, said layer of relatively flexible plastic material having a coating of graded intensity along a longitudinal edge portion thereof, the intensity increasing transversely toward its longitudinal edge comprising said longitudinal edge portion, said layer being more uniformly stressed and of more uniform thickness than a corresponding layer subjected to non-uniform stretching thereof during the handling prior to its assembly and lamination to form said window and being essentially free of rub marks formed when a printing roller is axially reciprocated while rolling against said layer to print said coating of graded intensity prior to said assembly and lamination.

2. A laminated window as in claim 1, wherein said outer curved sheet is composed of glass.

3. A laminated window as in claim 2, wherein said flexible material is a polyurethane.

4. A laminated window as in claim 2, wherein said outer glass sheet has a thickness of between 0.040 inch (1 millimeter) and 0.250 inch (6 millimeters) and said layer of flexible plastic material has a thickness between 0.015 inch (0.4 millimeter) and 0.060 inch (1.5 millimeters).

5. A laminated window as in claim 1, further including an inner curved sheet of relatively rigid, transparent glazing material selected from the group consisting of glass, polycarbonates, acrylic resins, hard polyurethanes and polyesters.

6. A laminated window as in claim 5, wherein said outer bent sheet is composed of glass.

7. A laminated window as in claim 5, wherein both said outer and inner curved sheets are composed of glass.

8. A laminated window as in claim 7, wherein each of said glass sheets has a thickness between 0.040 inch (1 millimeter) and 0.250 inch (6 millimeters) and said layer of flexible plastic has a thickness between 0.015 inch (0.4 millimeter) and 0.060 inch (1.5 millimeters).

9. A laminated window as in claim 8, wherein said layer of flexible plastic is composed of plasticized polyvinyl butyral.

10. A laminated window as in claim 8, wherein said layer of flexible plastic is composed of a polyurethane.

11. A laminated window as in claim 1, wherein said coating of graded intensity has a curved cut-off line along a boundary thereof remote from the edge of said longitudinal edge portion.

* * * * *